Jan. 20, 1931.  C. HENRY  1,789,748
TIRE BOOT
Filed July 12, 1929
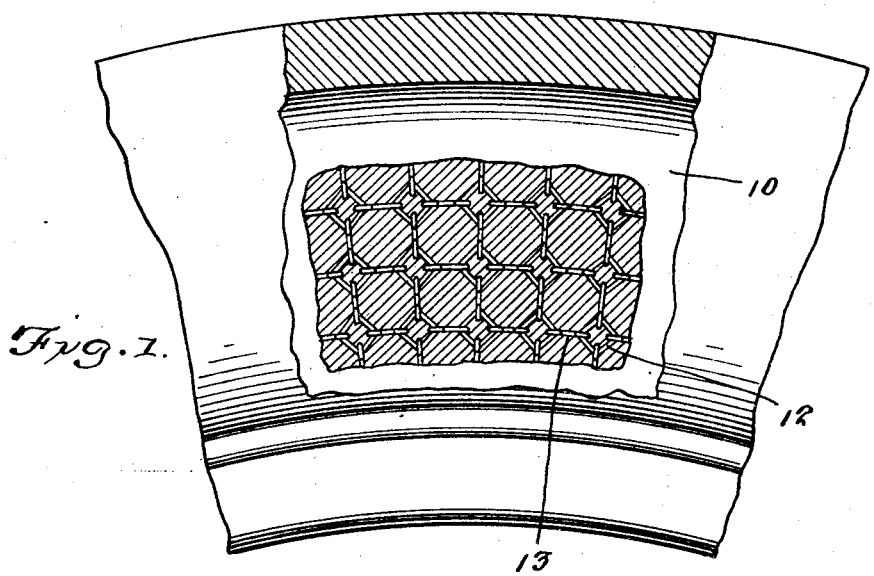
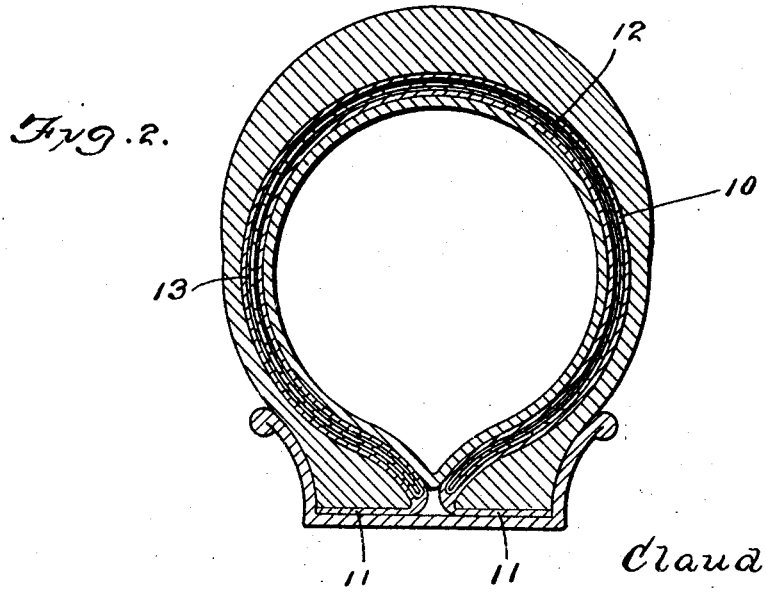
Claude Henry
INVENTOR
BY Victor J. Evans
ATTORNEY Patented Jan. 20, 1931

1,789,748

UNITED STATES PATENT OFFICE

CLAUDE HENRY, OF FLINT, MICHIGAN

TIRE BOOT

Application filed July 12, 1929. Serial No. 377,760.

This invention relates to new and useful improvements in tire and tire boot construction embodying among other characteristics a reinforced wall to prevent collapsing, bulging and weaving.

Another object of the invention contemplates the provision and arrangement of metallic links connected in such manner as to form a mesh.

An additional object of the invention consists of forming the links in such manner as to restrict weaving movement of the mesh and tearing apart of the wall construction.

With the above and other objects in view, the invention further consists of the following novel features and details of construction, to be hereinafter more fully described, illustrated in the accompanying drawing and pointed out in the appended claim.

In the drawing:—

Figure 1 is a fragmentary side elevation of a pneumatic tire casing partly broken away to indicate the relative arrangement of the mesh with the side wall therefor.

Figure 2 is a horizontal sectional view taken through the tire with the invention applied.

Referring to the drawing in detail wherein like characters of reference denote corresponding parts, the boot, as mentioned in the foregoing and which as termed in many parts of the country a blow-out patch, embodies many advantageous characteristics incident to the construction thereof which permits the using of tires having portions of the side walls therefor injured by curb scuff, stone bruises, tears, etc., by reinforcing the adjacent wall structure to relieve further bulging and to prevent the tire inner tube from protruding through the break and becoming punctured by direct contact with stones, curbs, and excessive pressure while the vehicle is being run over rough roads.

Such construction primarily resides in the provision of a casing generally indicated as at 10 and which conforms in general outline to the conventional shape of blow-out patch or boot. Flaps 11, formed upon the side edges of the patch or boot, are designed to extend beneath those portions of the tire bead engageable with the tire rim in the manner suggested in Figure 2 of the drawing whereby the patch or boot will be held against independent circumferential movement within the tire casing after the inner tube has been inflated. It will thus be noted that the blowout patch or boot is held against movement in several different ways whereby chafing of the tube and tire casing will be prevented incident to any abrasive action thereagainst on the part of the boot.

The mesh, as mentioned in the foregoing, is composed of links 12 preferably of diamond-shape and which subsequent to the relative arrangement thereof disclosed in Figure 1 of the drawing will permit the connection of relatively flat connecting links 13 with the adjacent aligned corners thereof whereby shifting or weaving action of the entire mesh subsequent to being vulcanized within the wall construction of the blowout patch or tire boot or in fact the side walls of a tire casing constructed in this manner, will not cause the wall construction to be torn, relieve bulging and preserve the shape of the tire to prevent the inner tube from becoming overinflated at any one point to cause a tire bulge. The pocket portions as defined between the links 12 and connecting links 13 are filled with the composition composing the side walls and hence form a component part of the article manufactured.

By constructing the diamond-shaped flat links in small sizes, greater flexibility of the side wall construction will be permitted to absorb road shocks instead of transmitting same to the body and occupants of the vehicle and prevent injury to the side wall construction in the event the tire has to be run in deflated condition for any distance. It is believed that the novel form of tire boot construction will prove most effective for the purpose set forth in the strengthening of the wall construction to prevent weaving and bulging of the tube and tire casing adjacent a weakened place or opening in the latter.

The invention is susceptible of various changes in its form, proportions and minor details of construction, and the right is herein reserved to make such changes as properly fall within the scope of the appended claim.

Having thus described the invention, what is claimed is:—

A tire boot construction having a link mesh included therewith, said mesh having links of diamond-shape arranged to dispose the corner portions thereof in alignment, and connecting links for the diamond-shaped links establishing flexible connection at their respective ends with the aligned corner portions of the diamond-shaped links relieving weaving and tearing of the wall construction.

In testimony whereof I affix my signature.

CLAUDE HENRY.